US012116906B2

(12) United States Patent
Joo et al.

(10) Patent No.: US 12,116,906 B2

(45) Date of Patent: Oct. 15, 2024

(54) TURBINE VANE IN GAS TURBINE ENGINE

(71) Applicant: SIEMENS ENERGY GLOBAL GMBH & CO. KG, Munich (DE)

(72) Inventors: Daniel Joo, Oviedo, FL (US); Ching-Pang Lee, Cincinnati, OH (US); Gm Salam Azad, Oviedo, FL (US); Sin Chien Siw, Simsbury, CT (US)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 18/269,037

(22) PCT Filed: Jan. 6, 2021

(86) PCT No.: PCT/US2021/012336

§ 371 (c)(1),
(2) Date: Jun. 22, 2023

(87) PCT Pub. No.: WO2022/150036

PCT Pub. Date: Jul. 14, 2022

(65) Prior Publication Data

US 2024/0076993 A1 Mar. 7, 2024

(51) Int. Cl.

*F01D 9/06* (2006.01)
*F01D 25/12* (2006.01)

(52) U.S. Cl.

CPC ............... *F01D 9/06* (2013.01); *F01D 25/12* (2013.01); *F05D 2220/32* (2013.01); *F05D 2240/12* (2013.01); *F05D 2260/20* (2013.01)

(58) Field of Classification Search

CPC ............. F01D 9/06; F01D 9/065; F01D 25/12
See application file for complete search history.

(56) References Cited

U.S. PATENT DOCUMENTS 5,488,825 A 2/1996 Davis et al.
5,609,466 A 3/1997 North et al.
(Continued)

FOREIGN PATENT DOCUMENTS

EP 0864728 A2 9/1998
EP 0919700 A1 6/1999
(Continued)

OTHER PUBLICATIONS

PCT International Search Report and Written Opinion of the International Searching Authority mailed Nov. 4, 2021 corresponding to PCT Application No. PCT/US2021/012336 filed Jan. 6, 2021.

*Primary Examiner* — Courtney D Heinle
*Assistant Examiner* — John S Hunter, Jr.

(57) ABSTRACT

A turbine vane in a gas turbine engine includes an inner platform, an outer platform, and a vane airfoil positioned therebetween. The vane airfoil includes a first cooling passage extending between the outer platform and the inner platform, and a second cooling passage extending between the outer platform and the inner platform. The second cooling passage is arranged downstream of the first cooling passage with respect to a flow direction. The turbine vane includes a jumper tube disposed between the second cooling passage and the inner platform. The jumper tube includes an inlet, an outlet, and a tube wall enclosing a hollow interior. The inlet is positioned a distance within the second cooling passage. The outlet is positioned at least partially through an aperture of the inner platform.

20 Claims, 5 Drawing Sheets

(56) References Cited

U.S. PATENT DOCUMENTS

| | | | | |
|---|---|---|---|---|
| 6,077,034 | A * | 6/2000 | Tomita | F01D 5/08 415/110 |
| 10,273,808 | B2 | 4/2019 | Spangler et al. | |
| 10,294,800 | B2 * | 5/2019 | Facchinetti | F01D 5/187 |

FOREIGN PATENT DOCUMENTS

| | | | |
|---|---|---|---|
| EP | 3508697 | A1 | 7/2019 |
| EP | 3514331 | A1 | 7/2019 |

* cited by examiner

TURBINE VANE IN GAS TURBINE ENGINE

BACKGROUND

An industrial gas turbine engine typically includes a compressor section, a turbine section, and a combustion section disposed therebetween. The compressor section includes multiple stages of rotating compressor blades and stationary compressor vanes. The combustion section typically includes a plurality of combustors.

The turbine section includes multiple stages of rotating turbine blades and stationary turbine vanes. Turbine blades and vanes often operate in a high temperature environment and are internally cooled.

BRIEF SUMMARY

A turbine vane in a gas turbine engine includes an inner platform having an aperture, an outer platform, and a vane airfoil positioned between the inner platform and the outer platform. The vane airfoil includes a first cooling passage extending between the outer platform and the inner platform, a second cooling passage extending between the outer platform and the inner platform. The second cooling passage is arranged downstream of the first cooling passage with respect to a flow direction. The turbine vane includes a jumper tube disposed between the second cooling passage and the inner platform. The jumper tube includes an inlet, an outlet, and a tube wall enclosing a hollow interior. The inlet is positioned a distance within the second cooling passage. The outlet is positioned at least partially through the aperture of the inner platform. The turbine vane includes a cover plate attached to the jumper tube and the inner platform.

A turbine vane in a gas turbine engine includes an inner platform having an aperture, an outer platform, and a vane airfoil positioned between the inner platform and the outer platform. The vane airfoil includes a first cooling passage extending between the outer platform and the inner platform, and a second cooling passage extending between the outer platform and the inner platform. The second cooling passage is arranged downstream of the first cooling passage with respect to a flow direction. The vane airfoil includes a third cooling passage arranged downstream of the second cooling passage with respect to the flow direction. The turbine vane includes a jumper tube having an inlet positioned a distance within the second cooling passage and an outlet positioned at least partially through the aperture of the inner platform and in fluid communication with an exterior of the inner platform. The first cooling passage directs a first flow of cooling air from the first cooling passage to the third cooling passage. The jumper tube directs a second flow of cooling air from the second cooling passage to the exterior of the inner platform.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
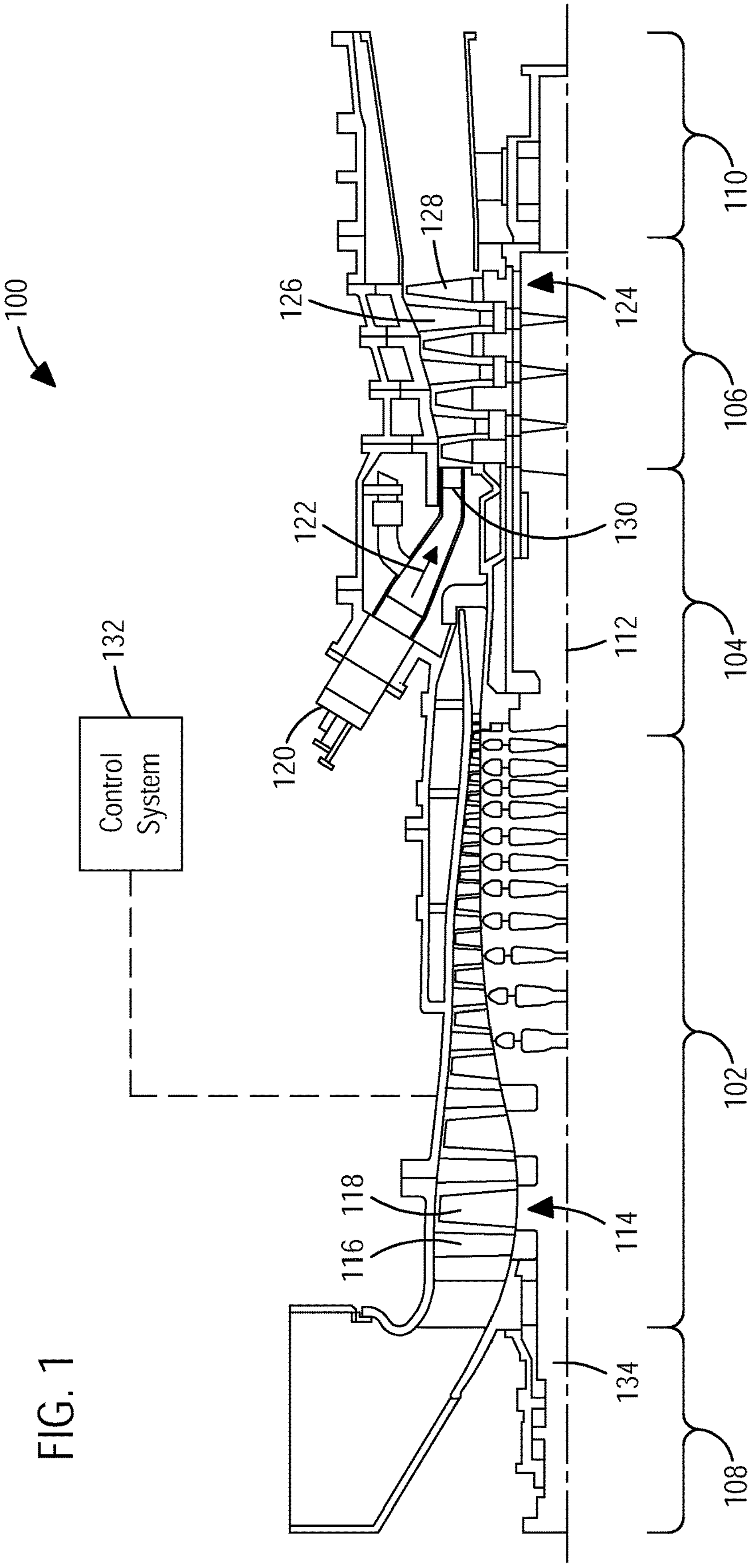
FIG. 1 is a longitudinal cross-sectional view of a gas turbine engine taken along a plane that contains a longitudinal axis or central axis.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

FIG. 1 illustrates an example of a gas turbine engine 100 including a compressor section 102, a combustion section 104, and a turbine section 106 arranged along a central axis 112. The compressor section 102 includes a plurality of compressor stages 114 with each compressor stage 114 including a set of rotating blades 118 and a set of stationary vanes 116 or adjustable guide vanes. A rotor 134 supports the rotating blades 118 for rotation about the central axis 112 during operation. In some constructions, a single one-piece rotor 134 extends the length of the gas turbine engine 100 and is supported for rotation by a bearing at either end. In other constructions, the rotor 134 is assembled from several separate spools that are attached to one another or may include multiple disk sections that are attached via a bolt or plurality of bolts.

The compressor section 102 is in fluid communication with an inlet section 108 to allow the gas turbine engine 100 to draw atmospheric air into the compressor section 102. During operation of the gas turbine engine 100, the compressor section 102 draws in atmospheric air and compresses that air for delivery to the combustion section 104. The illustrated compressor section 102 is an example of one compressor section 102 with other arrangements and designs being possible.

In the illustrated construction, the combustion section 104 includes a plurality of separate combustors 120 that each operate to mix a flow of fuel with the compressed air from the compressor section 102 and to combust that air-fuel mixture to produce a flow of high temperature, high pressure combustion gases or exhaust gas 122. Of course, many other arrangements of the combustion section 104 are possible.

The turbine section 106 includes a plurality of turbine stages 124 with each turbine stage 124 including a number of rotating turbine blades 128 and a number of stationary turbine vanes 126. The turbine stages 124 are arranged to receive the exhaust gas 122 from the combustion section 104 at a turbine inlet 130 and expand that gas to convert thermal and pressure energy into rotating or mechanical work. The turbine section 106 is connected to the compressor section 102 to drive the compressor section 102. For gas turbine engines 100 used for power generation or as prime movers, the turbine section 106 is also connected to a generator, pump, or other device to be driven. As with the compressor section 102, other designs and arrangements of the turbine section 106 are possible.

An exhaust portion 110 is positioned downstream of the turbine section 106 and is arranged to receive the expanded flow of exhaust gas 122 from the final turbine stage 124 in the turbine section 106. The exhaust portion 110 is arranged to efficiently direct the exhaust gas 122 away from the turbine section 106 to assure efficient operation of the turbine section 106. Many variations and design differences are possible in the exhaust portion 110. As such, the illustrated exhaust portion 110 is but one example of those variations.

A control system 132 is coupled to the gas turbine engine 100 and operates to monitor various operating parameters and to control various operations of the gas turbine engine 100. In preferred constructions the control system 132 is typically micro-processor based and includes memory devices and data storage devices for collecting, analyzing, and storing data. In addition, the control system 132 provides output data to various devices including monitors, printers, indicators, and the like that allow users to interface with the control system 132 to provide inputs or adjustments. In the example of a power generation system, a user may input a power output set point and the control system 132 may adjust the various control inputs to achieve that power output in an efficient manner.

The control system 132 can control various operating parameters including, but not limited to variable inlet guide vane positions, fuel flow rates and pressures, engine speed, valve positions, generator load, and generator excitation. Of course, other applications may have fewer or more controllable devices. The control system 132 also monitors various parameters to assure that the gas turbine engine 100 is operating properly. Some parameters that are monitored may include inlet air temperature, compressor outlet temperature and pressure, combustor outlet temperature, fuel flow rate, generator power output, bearing temperature, and the like. Many of these measurements are displayed for the user and are logged for later review should such a review be necessary.

In the description, the terms "axial" or "axially" refer to a direction along a longitudinal axis of a gas turbine engine. The terms "radial" or "radially" refer to a direction perpendicular to the longitudinal axis of the gas turbine engine. The terms "downstream" or "aft" refer to a direction along a flow direction. The terms "upstream" or "forward" refer to a direction against the flow direction.

Figure 2:
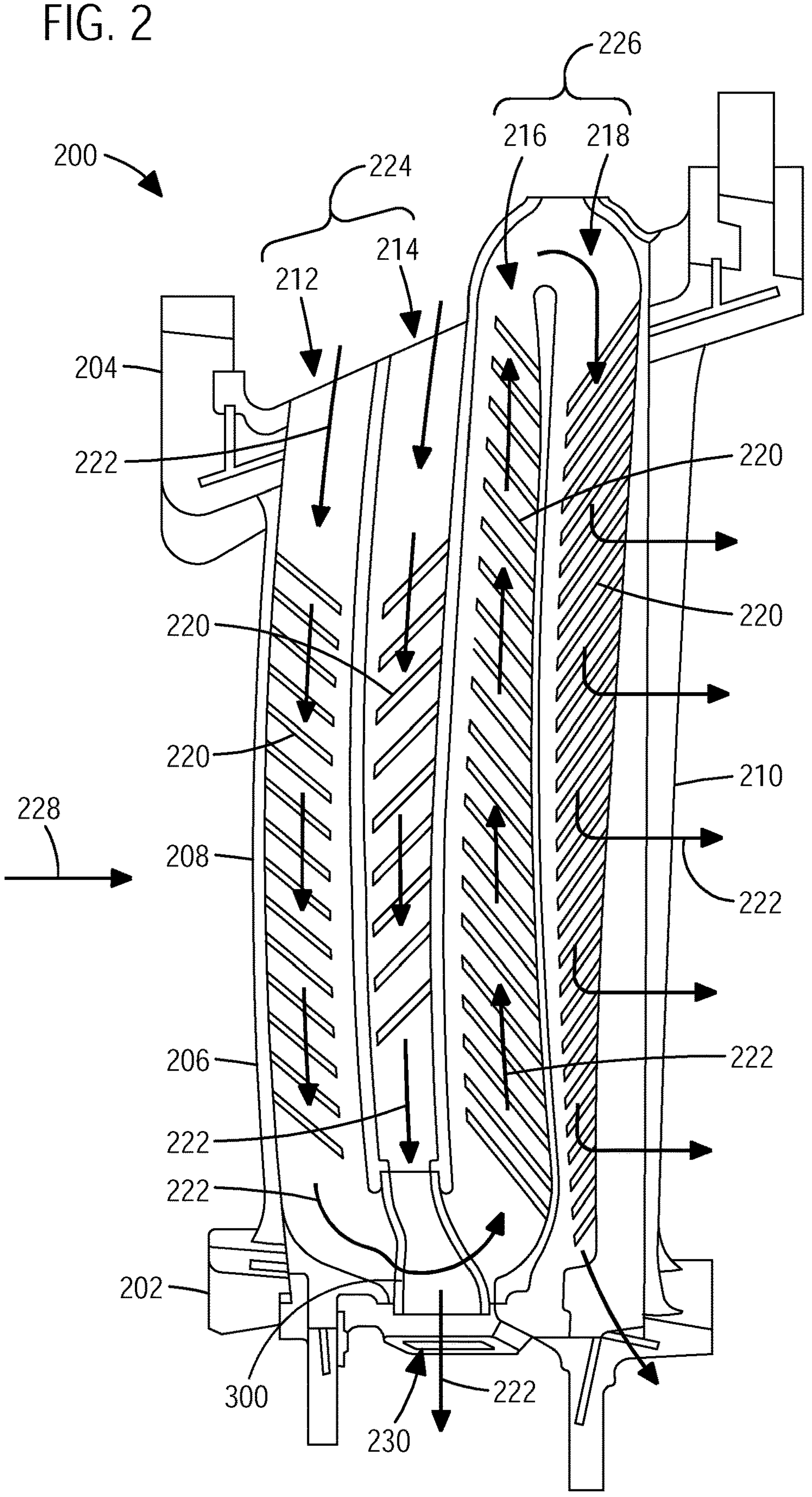
FIG. 2 is a cross-sectional view of a turbine vane taken along a plane that is parallel to a flow direction.

FIG. 2 is a cross section view of a turbine vane 200 taken along a plane that is parallel to a flow direction 228 of the exhaust gas 122 (shown in FIG. 1). The turbine vane 200 is one of a plurality of turbine vanes 200 that are arranged next to each other circumferentially in the gas turbine engine 100 to define a row of stationary turbine vanes 200. The turbine vane 200 can be one of the stationary turbine vanes 126 used in the gas turbine engine 100.

The turbine vane 200 includes an inner platform 202, an outer platform 204, and a vane airfoil 206 positioned between the inner platform 202 and the outer platform 204. The inner platform 202 has an aperture 230. The vane airfoil 206 includes a leading edge 208 and a trailing edge 210 with respect to the flow direction 228 of the exhaust gas 122.

The turbine vane 200 includes a plurality of cooling passages disposed in an interior of the vane airfoil 206. The plurality of cooling passages extend between the inner platform 202 and the outer platform 204. The plurality of cooling passages include a first cooling passage 212 arranged at or near the leading edge 208, a second cooling passage 214 arranged downstream of the first cooling passage 212 with respect to the flow direction 228, a third cooling passage 216 arranged downstream of the second cooling passage 214, and a trailing edge cooling passage 218. The first cooling passage 212 and the second cooling passage 214 form a leading cooling circuit 224. The third cooling passage 216 and the trailing edge cooling passage 218 form a trailing cooling circuit 226. In the construction shown in FIG. 2, the turbine vane 200 has two cooling circuits, the leading cooling circuit 224 and the trailing cooling circuit 226. However, in other constructions, it is possible that the turbine vane 200 may have any number of cooling circuits. It is also possible that each cooling circuit may have any number of cooling passages.

Turbulator ribs 220 are disposed in each of the cooling passages. In the construction shown in FIG. 2, the turbulator ribs 220 are disposed in the first cooling passage 212, the second cooling passage 214, the third cooling passage 216, and the trailing edge cooling passage 218. The turbulator ribs 220 may be evenly distributed along the first cooling passage 212, the second cooling passage 214, the third cooling passage 216, and the trailing edge cooling passage 218 between the inner platform 202 and the outer platform 204. The turbulator ribs 220 are oriented with an angle with respect to a flow direction of a cooling air 222. For example, the turbulator ribs 220 may be oriented at a 45-degree angle with respect to the flow direction of the cooling air 222. It is possible that the turbulator ribs 220 may be oriented at any desired angle with respect to the flow direction of the cooling air 222 that is defined by the design of the gas turbine engine 100. In addition, it is possible that one or more of the first cooling passage 212, the second cooling passage 214, the third cooling passage 216, and the trailing edge cooling passage 218 may omit turbulator ribs 220 completely or partially.

The turbine vane 200 includes a jumper tube 300 disposed between the inner platform 202 and the second cooling passage 214. One end of the jumper tube 300 is positioned a distance within the second cooling passage 214. The other end of the jumper tube 300 is positioned at least partially through the aperture 230 of the inner platform 202 and is in fluid communication with an exterior of the inner platform 202.

Figure 3:
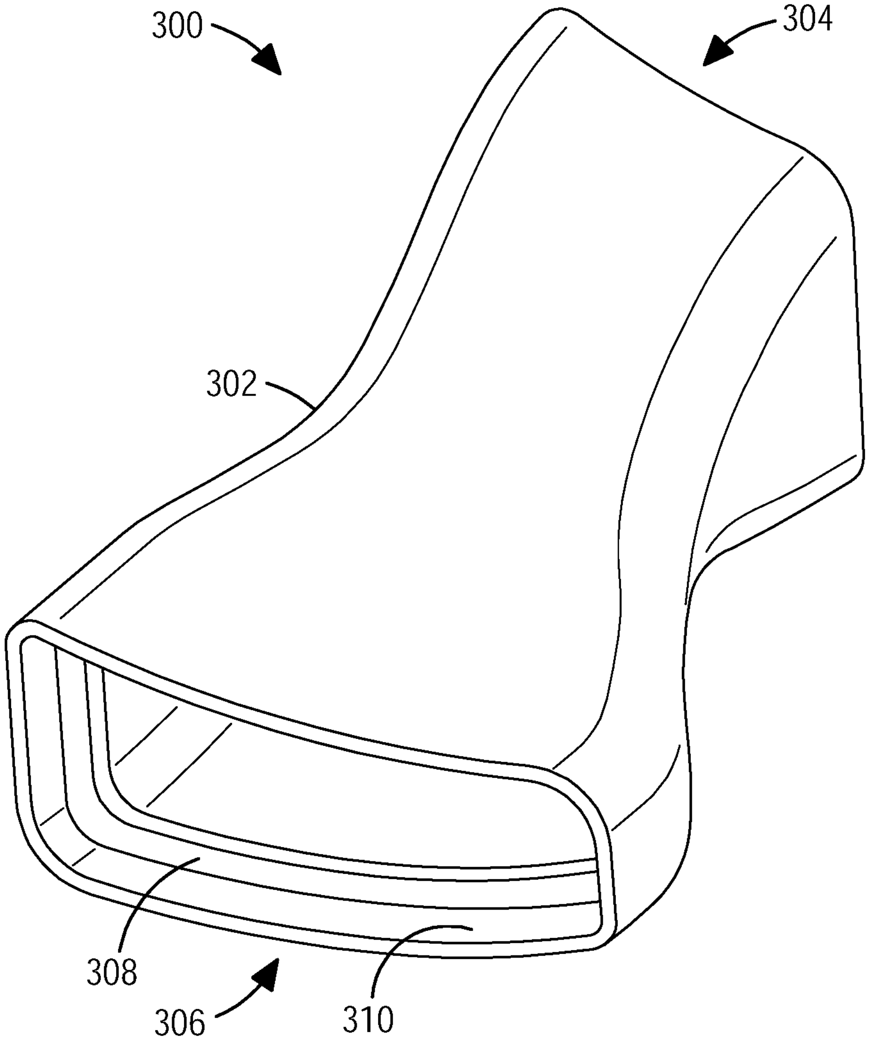
FIG. 3 is a perspective view of a jumper tube.

FIG. 3 is a perspective view of the jumper tube 300 shown in FIG. 2. The jumper tube 300 has a general hollow cuboid shape. The jumper tube 300 has curved edges at corners of adjacent side surfaces of the jumper tube 300. The jumper tube 300 has a tube wall 302 that encloses a hollow interior. The jumper tube 300 has an inlet 304 and an outlet 306. The inlet 304 has a general rectangular shape. The outlet 306 has a general rectangular shape. Of course, virtually the inlet 304 and the outlet 306 could have any shapes as may be desired. An area of the outlet 306 is different than an area of the inlet 304. In the construction shown in FIG. 3, the area of the outlet 306 is larger than the area of the inlet 304. It is possible that the area of the outlet 306 is less than or the same as the area of the inlet 304.

The tube wall 302 has a curved shape such that the minimum area of the jumper tube 300 is not at the inlet 304 or the outlet 306 but rather between the inlet 304 and the outlet 306. The tube wall 302 has a smooth curved shape. The tube wall 302 is curved at four side surfaces of the jumper tube 300. Curvatures of the tube wall 302 at different side surfaces is different. A portion of the tube wall 302 toward the outlet 306 may have a straight shape. Of course, virtually the tube wall 302 could have any shapes as may be desired.

The jumper tube 300 has a throttle plate 308. The throttle plate 308 is attached to an inner surface 310 of the jumper tube 300 and extends around an inner perimeter of the jumper tube 300. The throttle plate 308 may be welded to the inner perimeter of the jumper tube 300 or formed as part of the jumper tube 300. The throttle plate 308 is disposed at a distance from the outlet 306. The distance may be designed to allow performing the welding. It is possible that the throttle plate 308 is attached to the inner surface 310 of the jumper tube 300 by any methods that are known in the industry. It is also possible that the throttle plate 308 is disposed at the outlet 306.

In the construction shown in FIG. 3, the jumper tube 300 has a general hollow cuboid shape. However, in other constructions, it is possible that the jumper tube 300 may have any desired shapes, such as a hollow cylindrical shape, a hollow cone shape, a hollow ellipsoid shape, etc. It is also possible that the area of the outlet 306 may be equal to or smaller than the area of the inlet 304. It is also possible that the tube wall 302 may be curved at two opposite side surfaces of the jumper tube 300. It is also possible that curvatures of the tube wall 302 at different side surfaces may be the same. It is also possible that the tube wall 302 may be straight between the inlet 304 and the outlet 306.

Figure 4:
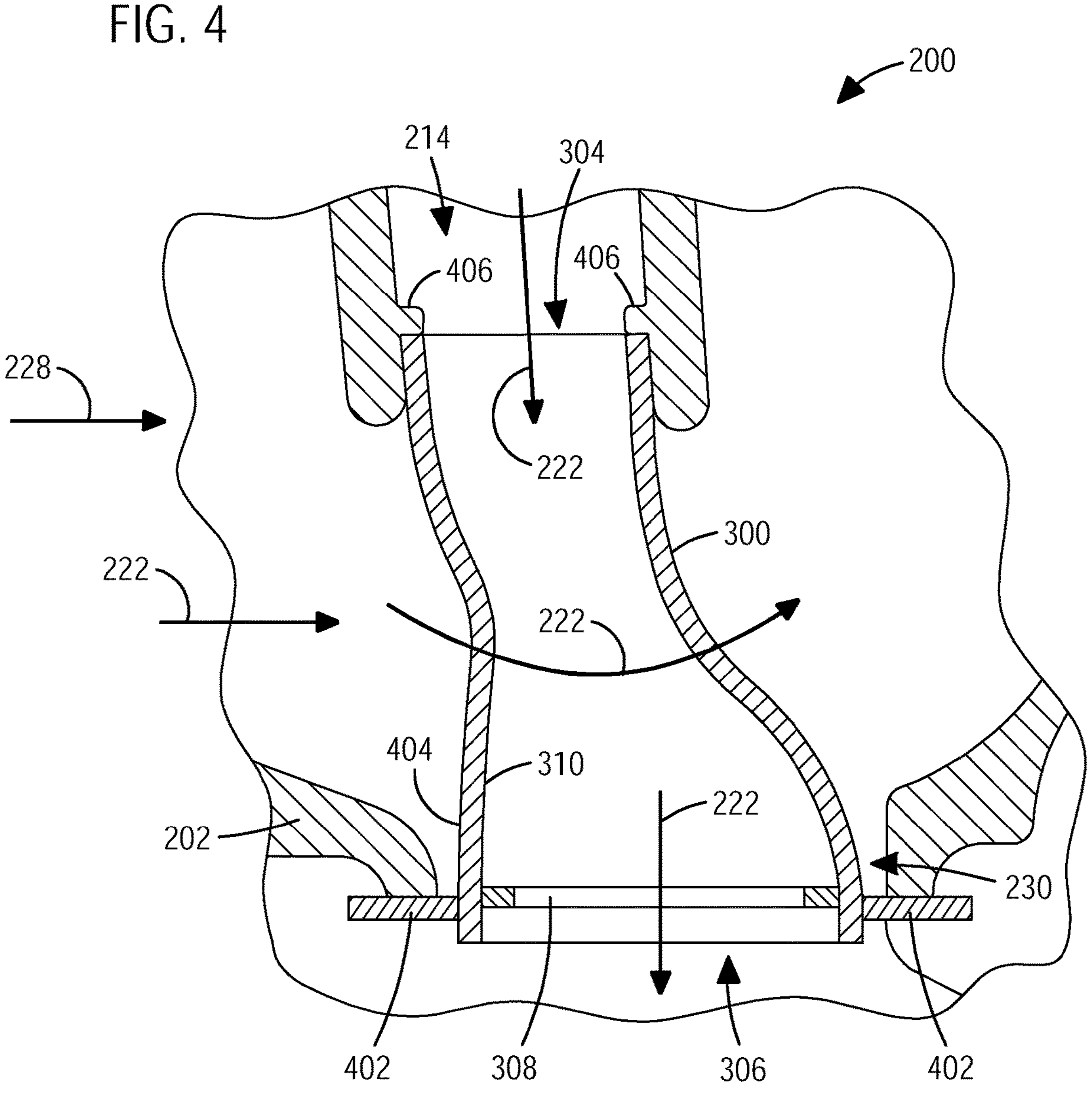
FIG. 4 is an enlarged view of a portion of the turbine vane of FIG. 2.
Figure 5:
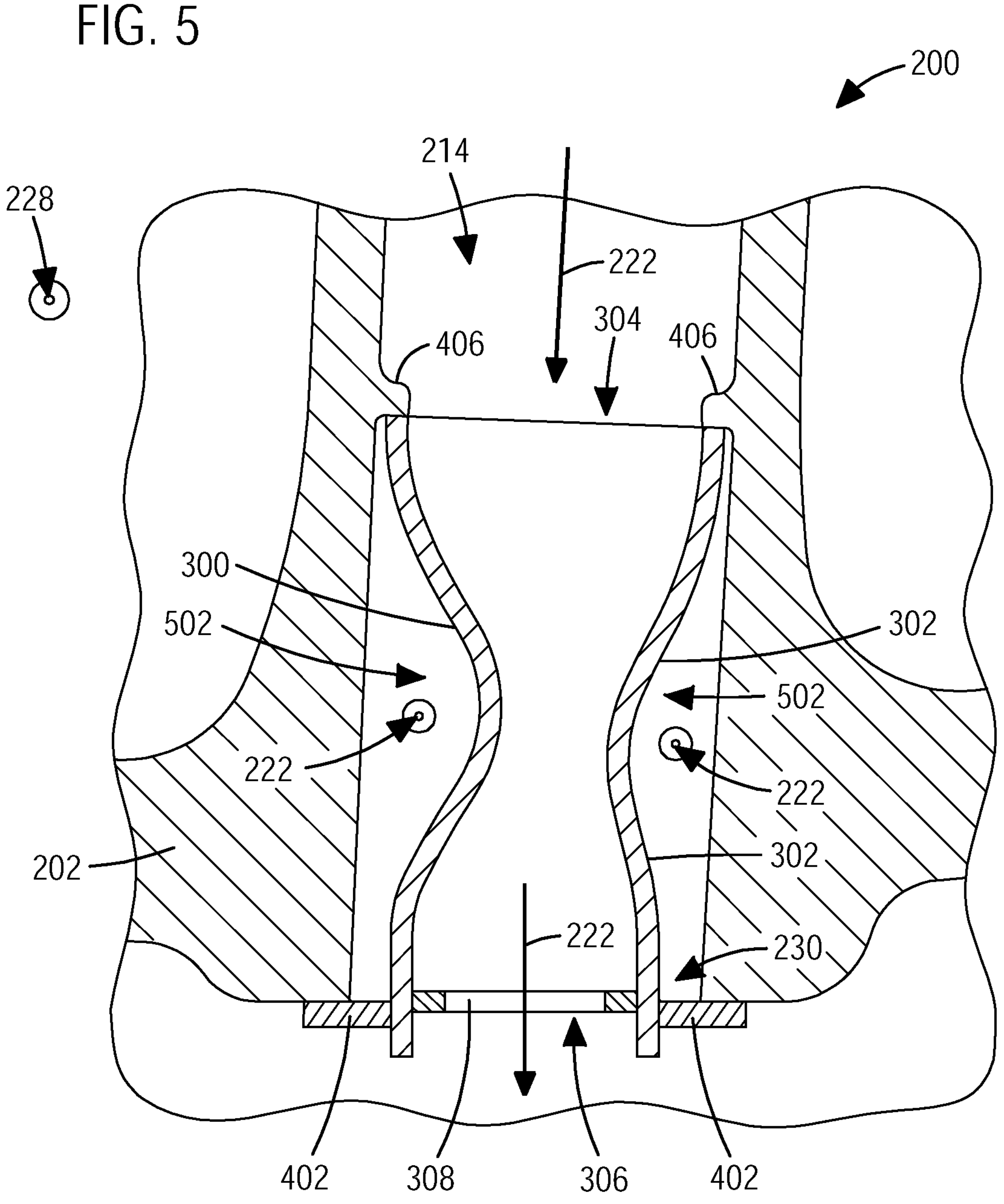
FIG. 5 is a different view of the turbine vane of FIG. 4.

FIG. 4 is an enlarged view of a portion of the turbine vane 200 of FIG. 2 looking in a direction normal to the flow direction 228. FIG. 5 is a different view of the turbine vane 200 of FIG. 4 looking in a direction parallel to the flow direction 228.

With reference to FIG. 4, a dimension of the inlet 304 is smaller than a dimension of the outlet 306 in a direction parallel to the flow direction 228. It is possible that the dimension of the inlet 304 is larger than or the same as the dimension of the outlet 306 in the direction parallel to the flow direction 228.

With reference to FIG. 5, a dimension of the inlet 304 is larger than a dimension of the outlet 306 in a direction normal to the flow direction 228. It is possible that the dimension of the inlet 304 is less than or the same as the dimension of the outlet 306 in the direction normal to the flow direction 228.

With reference to FIG. 4 and FIG. 5, the outlet 306 of the jumper tube 300 is positioned through the aperture 230 of the inner platform 202. A cover plate 402 is attached to an outer surface 404 of the jumper tube 300 and extends around an outer perimeter of the jumper tube 300. The cover plate 402 is disposed at a location close to the outlet 306 of the jumper tube 300. The cover plate 402 is also attached to an outer surface of the inner platform 202 that is facing away from the outer platform 204. The jumper tube 300 is thus fixed to the inner platform 202 via the cover plate 402. The cover plate 402 may be welded, brazed, or otherwise attached to the jumper tube 300 and the inner platform 202. The outlet 306 of the jumper tube 300 may protrude a distance from the inner platform 202. The distance is selected to allow performing the welding. However, it is possible that the cover plate 402 may be attached to the jumper tube 300 and the inner platform 202 by any attaching techniques known in the industry.

The inlet 304 of the jumper tube 300 is positioned a distance within the second cooling passage 214. The inlet 304 of the jumper tube 300 is positioned at least a portion of the span length of the second cooling passage 214. For example, the inlet 304 of the jumper tube 300 may be positioned between 3%-20% of the span length of the vane airfoil 206. It is also possible that the jumper tube 300 may be positioned within the second cooling passage 214 any desired percentage span length of the vane airfoil 206, for example, between 4%-18%, or between 5%-15%, etc.

The second cooling passage 214 has a collar 406 disposed at an inner perimeter of the second cooling passage 214. The collar 406 is a bump that extends away from the inner perimeter of the second cooling passage 214. The inlet 304 of the jumper tube 300 is disposed adjacent to or abutting the collar 406. However, in other constructions, it is possible that the second cooling passage 214 may omit the collar 406.

In assembly, the jumper tube 300 is inserted into the second cooling passage 214 through the inner platform 202 until the inlet 304 of the jumper tube 300 contacts the collar 406. The jumper tube 300 may then be pulled away from the collar 406 for a distance to allow thermal growth of the jumper tube 300 during operation of the gas turbine engine 100. The distance, for example, may be between 0.5 mm to 1 mm, or any desired distance.

In operation of the gas turbine engine 100, with reference to FIG. 1, FIG. 2, FIG. 3, FIG. 4, and FIG. 5, the cooling air 222 is bled from the compressor section 102 to the turbine section 106. A first flow of the cooling air 222 is fed into the first cooling passage 212 and a second flow of the cooling air 222 is fed into the second cooling passage 214 in parallel through the outer platform 204. The cooling air 222 flows in the first cooling passage 212 and the second cooling passage 214 from the outer platform 204 to the inner platform 202 for cooling the vane airfoil 206.

With reference to FIG. 2, the first flow of the cooling air 222 exits the first cooling passage 212 at the inner platform 202 and flows around the outer perimeter of the jumper tube 300 via a flow area 502, as illustrated in FIG. 5, and enters the third cooling passage 216. The flow area 502 is defined between an inner surface of the interior of the vane airfoil 206 and the outer perimeter of the jumper tube 300. The first flow of the cooling air 222 flows in the third cooling passage 216 from the inner platform 202 to the outer platform 204 for cooling the vane airfoil 206. The first flow of the cooling air 222 exits the third cooling passage 216 at the outer platform 204 and serpentines to the trailing edge cooling passage 218. The first flow of the cooling air 222 flows in the trailing edge cooling passage 218 from the outer platform 204 to the inner platform 202 and exits the turbine vane 200 at the trailing edge 210. The profile of the tube wall 302 is selected to direct the first flow of the cooling air 222 from the first cooling passage 212 through the flow area 502 and around the outer perimeter of the jumper tube 300 to the third cooling passage 216 while reducing pressure losses when turning into the third cooling passage 216 at the inner platform 202.

The second flow of the cooling air 222 exits the second cooling passage 214 and enters the jumper tube 300 at the inlet 304 of the jumper tube 300. The second flow of the cooling air 222 flows through the jumper tube 300 and exits the turbine vane 200 from the outlet 306 of the jumper tube 300 to an exterior of the inner platform 202. The cooling air 222 is directed by the jumper tube 300 from the second cooling passage 214 to the exterior of the inner platform 202. The cooling air 222 exiting the turbine vane 200 provides cooling to other components of the gas turbine engine 100, such as an inter-stage-seal-housing (not shown). The size of the throttle plate 308 is selected to control the amount of the cooling air 222 that is bled from the turbine vane 200 to meet the cooling requirement of the inter-stage-seal-housing.

The temperature of the cooling air 222 at the exits of the first cooling passage 212 and the second cooling passage 214 are higher than the temperature of the cooling air 222 at the entrances of the first cooling passage 212 and the second cooling passage 214. The temperature of the cooling air 222 at the exit of the first cooling passage 212 is higher than the temperature of the cooling air 222 at the exit of the second cooling passage 214 due to the first cooling passage 212 being disposed at or closer to the leading edge 208 than the second cooling passage 214.

By placing the jumper tube 300 between the inner platform 202 and the second cooling passage 214, the cooler cooling air 222 exiting the second cooling passage 214 enters the jumper tube 300 without mixing with the hotter cooling air 222 exiting the first cooling passage 212. Such an arrangement allows the cooler second flow of the cooling air 222 from the second cooling passage 214 to exit the turbine vane 200 at a slightly cooler temperature than it would have had it mixed with the first flow of the cooling air 222 exiting the first cooling passage 212 to better cool other components of the gas turbine engine 100, such as the inter-stage-seal-housing. The arrangement improves cooling of the gas turbine engine 100 during operation.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A turbine vane in a gas turbine engine, the turbine vane comprising:
- an inner platform having an aperture;
- an outer platform;
- a vane airfoil positioned between the inner platform and the outer platform, the vane airfoil comprising:
  - a first cooling passage extending between the outer platform and the inner platform;
  - a second cooling passage extending between the outer platform and the inner platform, the second cooling passage arranged downstream of the first cooling passage with respect to a flow direction;
  - a jumper tube disposed between the second cooling passage and the inner platform, the jumper tube comprising an inlet, an outlet, and a tube wall enclosing a hollow interior, the inlet positioned a distance within the second cooling passage, and the outlet positioned at least partially through the aperture of the inner platform; and
  - a cover plate attached to the jumper tube and the inner platform,
  - wherein the inlet is positioned at a portion of a span length of the second cooling passage such that a gap is defined between the inlet and the outer platform within the second cooling passage.

2. The turbine vane of claim 1, wherein the tube wall comprises a curved shape.

3. The turbine vane of claim 1, wherein the jumper tube comprises a general hollow cuboid shape.

4. The turbine vane of claim 1, wherein an area of the outlet of the jumper tube is different than an area of the inlet of the jumper tube.

5. The turbine vane of claim 1, wherein the minimum area of the jumper tube is between the inlet of the jumper tube and the outlet of the jumper tube.

6. The turbine vane of claim 1, wherein the jumper tube comprises a throttle plate attached to an inner surface of the jumper tube and extends around an inner perimeter of the jumper tube.

7. The turbine vane of claim 1, wherein the cover plate is attached to an outer surface of the jumper tube and extends around an outer perimeter of the jumper tube.

8. The turbine vane of claim 1, wherein the cover plate is attached to an outer surface of the inner platform.

9. The turbine vane of claim 1, wherein the second cooling passage comprises a collar disposed at an inner surface of the second cooling passage.

10. The turbine vane of claim 9, wherein the inlet of the jumper tube is disposed adjacent to the collar.

11. A turbine vane in a gas turbine engine, the turbine vane comprising:

an inner platform having an aperture;

an outer platform;

a vane airfoil positioned between the inner platform and the outer platform, the vane airfoil comprising:

a first cooling passage extending between the outer platform and the inner platform;

a second cooling passage extending between the outer platform and the inner platform, the second cooling passage arranged downstream of the first cooling passage with respect to a flow direction;

a third cooling passage arranged downstream of the second cooling passage with respect to the flow direction; and a jumper tube having an inlet positioned a distance within the second cooling passage and an outlet positioned at least partially through the aperture of the inner platform and in fluid communication with an exterior of the inner platform, the first cooling passage directing a first flow of cooling air from the first cooling passage to the third cooling passage, the jumper tube directing a second flow of cooling air from the second cooling passage to the exterior of the inner platform, wherein the inlet is positioned at a portion of a span length of the second cooling passage such that a gap is defined between the inlet and the outer platform within the second cooling passage.

12. The turbine vane of claim 11, wherein the jumper tube comprises a general hollow cuboid shape.

13. The turbine vane of claim 11, wherein an area of the outlet of the jumper tube is different than an area of the inlet of the jumper tube.

14. The turbine vane of claim 11, wherein the minimum area of the jumper tube is between the inlet of the jumper tube and the outlet of the jumper tube.

15. The turbine vane of claim 11, wherein the jumper tube comprises a throttle plate attached to an inner surface of the jumper tube and extends around an inner perimeter of the jumper tube.

16. The turbine vane of claim 11, further comprising a cover plate attached to the jumper tube and the inner platform.

17. The turbine vane of claim 16, wherein the cover plate is attached to an outer surface of the jumper tube and extends around an outer perimeter of the jumper tube.

18. The turbine vane of claim 16, wherein the cover plate is attached to an outer surface of the inner platform.

19. The turbine vane of claim 11, wherein the second cooling passage comprises a collar disposed at an inner surface of the second cooling passage.

20. The turbine vane of claim 19, wherein the inlet of the jumper tube is disposed adjacent to the collar.

* * * * *